United States Patent [19]

Martini

[11] Patent Number: 5,775,701
[45] Date of Patent: Jul. 7, 1998

[54] EXHAUST TUBE GASKET FOR COMBUSTION GASES

[75] Inventor: Gino Martini, Biella, Italy

[73] Assignee: Tako Payen S.p.A., Turin, Italy

[21] Appl. No.: 742,618

[22] Filed: Nov. 1, 1996

[30] Foreign Application Priority Data

Nov. 23, 1995 [EP] European Pat. Off. ............ 95830490

[51] Int. Cl.$^6$ .................................................... F16J 15/00
[52] U.S. Cl. .................................. 277/207 R; 277/207 A; 277/213; 277/236
[58] Field of Search .................... 277/207 R, 207 A, 277/213, 235 B, 236, 200, 180, 209, 211; 285/910, 917

[56] References Cited

U.S. PATENT DOCUMENTS

| | | |
|---|---|---|
| 4,387,904 | 6/1983 | Nicholson . |
| 4,603,892 | 8/1986 | Abbes et al. ............... 285/917 |
| 4,767,124 | 8/1988 | Udagawa ..................... 277/236 |
| 4,834,399 | 5/1989 | Udagawa et al. ............ 277/235 B |
| 5,022,661 | 6/1991 | Nakasene .................... 277/235 B |
| 5,169,163 | 12/1992 | Udagawa et al. ........... 277/235 B |

FOREIGN PATENT DOCUMENTS

| | | |
|---|---|---|
| A-2107549 | 5/1972 | France . |
| A-2526113 | 9/1983 | France . |
| 0113968 | 5/1987 | Japan ........................... 277/235 B |

*Primary Examiner*—Daniel G. DePumpo
*Attorney, Agent, or Firm*—Guido Modiano; Albert Josif; Daniel J. O'Byrne

[57] ABSTRACT

The exhaust tube gasket comprises two elastically squeezable steel rings (20, 22; 120, 122) received on an annular, malleable steel sheet (10; 110). One of the rings (20; 120) closely surrounds the tube passage, while the other, outer ring (22; 122) follows the contour of the joining flanges of the exhaust tube. The inner and outer rims (28, 30; 128, 130) of the steel sheet are folded to extend over the two rings (20, 22; 120, 122), leaving an uncovered space (32) between them. The two rings are preferably V-shaped in cross-section, and they may be joined to each other as an integral plate (40). The outer ring (24; 124) may be absent.

2 Claims, 2 Drawing Sheets

EXHAUST TUBE GASKET FOR COMBUSTION GASES

BACKGROUND OF THE INVENTION

This invention is concerned with a gasket for exhaust tubes for combustion gases, particularly of internal combustion engines.

Conventionally, exhaust tubes of internal combustion engines, such as in motor vehicles, are connected with flat-flange joints, which are clamped by two or three peripheral bolts. The high temperatures reached by the exhaust gas along the conduit (800° C. and above) have prevented in fact the use of most of the usual gaskets, with the exception of asbestos gaskets, which, however, are undesirable on the ground of unhealthiness. Although such gasketless joints make a defective seal, this has not been a problem with conventional exhausts, where the exhaust gas has been led through the muffler only for purposes of silencing, small pressure leaks along the conduit having no harmful practical consequence.

On the other hand, the problem of achieving a perfect seal does arise with modern catalytic mufflers, as well known to persons skilled in the art. In these exhausts, the seal is improved by insertion of a mica gasket in the joint, which gasket, as known, has the required property of resistance to high temperatures. Mica, however, is an expensive material, is difficult to process, and, moreover, has a relatively low elasticity, which falls in the course of time. Because of this, mica-based gaskets in exhaust tubes require frequent replacement.

As an alternative to mica-based gaskets, EP-A-0 640 782 has proposed a graphite-based gasket which is fully encapsulated in steel sheet. The steel sheet prevents contact of the graphite with the oxygen in the outside atmosphere and is provided with ridges around the gasket passage. Although graphite has a better elasticity than mica, the steel sheet envelope fails to prevent the graphite from deteriorating in the long run, and from consequently losing its initial elastic properties.

Accordingly, it is the main object of this invention to provide an exhaust tube gasket for hot combustion gases particularly of internal combustion engines, which is easy and cheap to manufacture, and which will afford a good seal and temperature resistance for a long period without deterioration.

SUMMARY OF THE INVENTION

The above object, together with other objects and advantages, such as will appear in the following disclosure, is attained by the invention with a gasket having the features recited in claim 1.

BRIEF DESCRIPTION OF THE INVENTION

The invention will now be described in more detail with reference to a few preferred embodiments, which are disclosed in the following specification and shown in the accompanying drawings, wherein.

DESCRIPTION OF A PREFERRED EMBODIMENT

Figure 1:
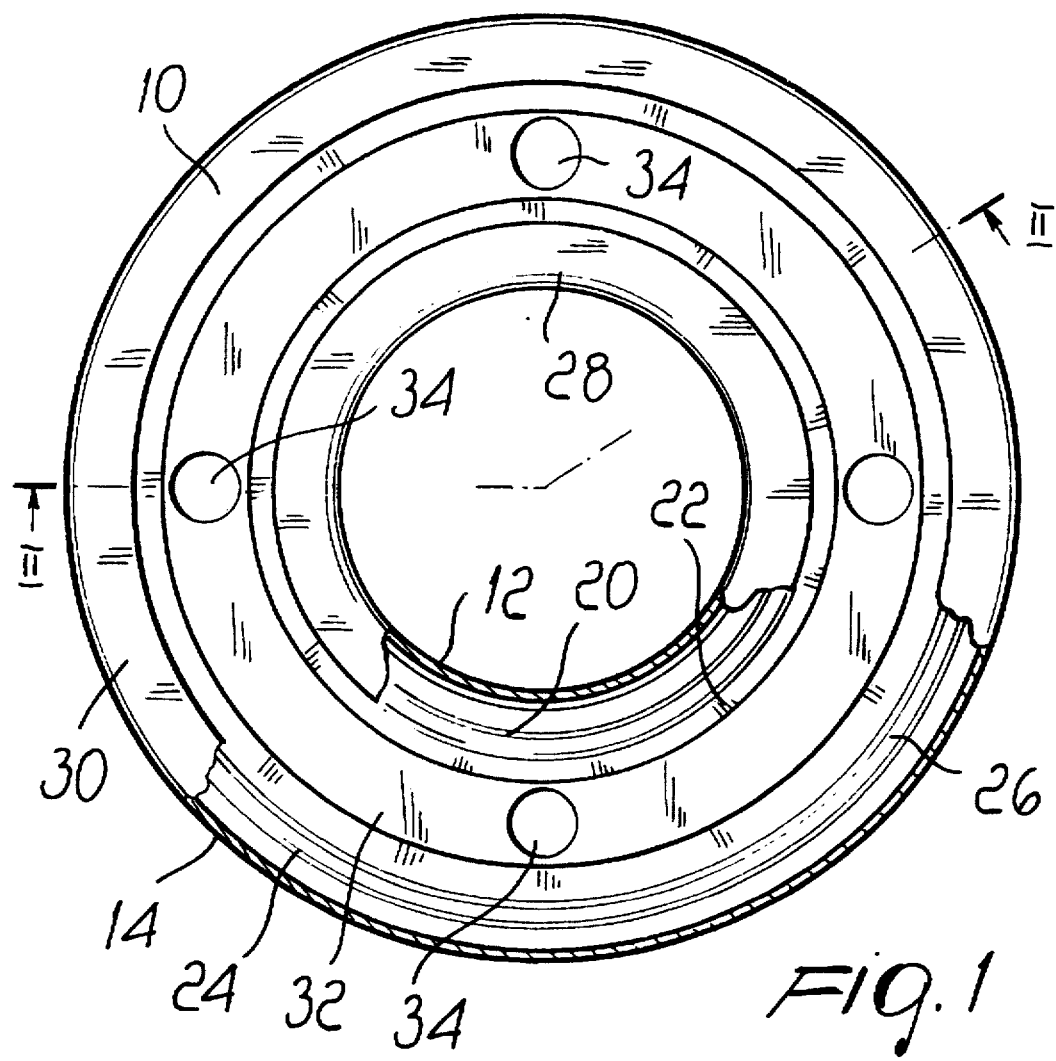
FIG. 1 is a plan view of a gasket, partially broken away, for an exhaust tube of an internal combustion engine according to a first preferred embodiment of the invention.
Figure 2:
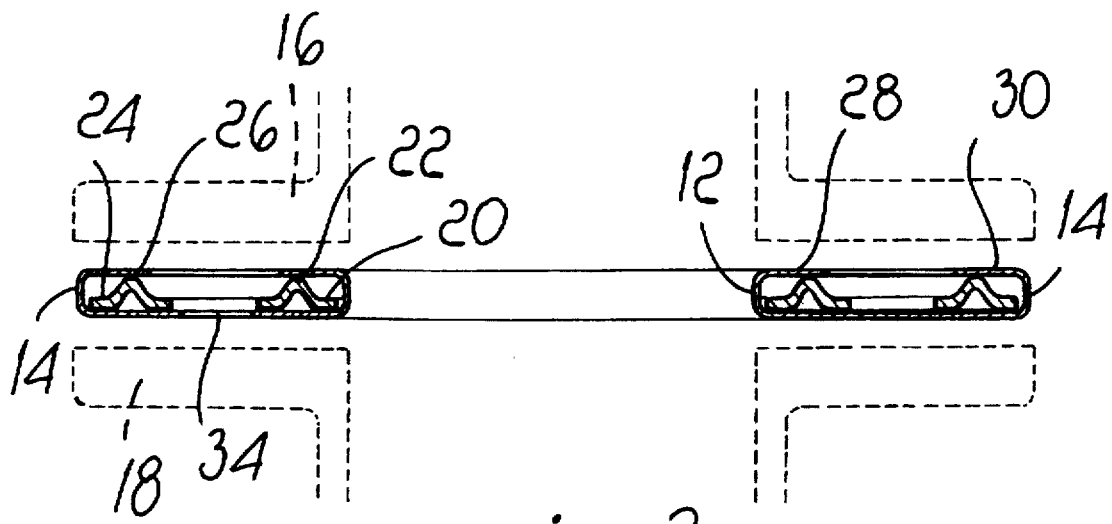
FIG. 2 is a cross-sectional view made along line II—II of FIG. 1.

FIGS. 1 and 2 show a gasket designed, according to the teachings of the invention, for sealing a joint in an exhaust tube with a circular flange. A 0.20 mm thick, malleable steel sheet 10, e.g. made of steel AISI 310, or AISI 301, or AISI 321, is punched in form of a circular annulus and is spun, as known in the art, to have an inner wall 12 at right angles to the plane of the sheet and defining a passage corresponding to the passage in the exhaust tube; and an outer wall 14, also at right angles to the plane of the gasket, substantially corresponding to the outside profile of the exhaust tube flange. The exhaust tube flanges are diagrammatically shown in dashed lines as 16, 18 on FIG. 2.

A ring 20, made of an elastic steel plate (or of hardened and tempered C72 steel), is punched and moulded to have an annular, V-shaped ridge 22, and is received on sheet 10 along its inner wall 12. A similar ring 24, having an annular ridge 26, is received on sheet 10 along its outer wall 14. Walls 12, 14 are rolled or folded onto the ridges of rings 20, 24 to form respective rims 28, 30, which barely cover the respective ridges and leave an annular gap 32 uncovered.

Four bolt holes 34 are punched in steel sheet 10, in the area of the annular gap 32 between rims 28, 30, to allow clamping bolts (not shown) to extend through the gasket between the opposite flanges 16, 18 of the exhaust tube.

When the gasket as described above is placed in operation and is clamped between flanges 16, 18 of respective sections of an exhaust tube, the ridges 22, 26 of rings 20, 24 are squeezed down elastically until the rings become substantially flat, while the walls 12, 14 are deformed plastically. Rings 20, 24 will therefore react elastically and provide a sealing pressure against both flanges.

However, in contrast to known gaskets, where the clamping pressure is distributed substantially uniformly on the entire surface of the flanges, because the gasket generally has flat and uniform opposite surfaces, in the gasket as described above the pressure applies only along two circles at rims 28, 30, the upper flange 16 having no contact at all with the gasket above annular gap 32.

Therefore, for a given total elastic force developed by both rings when squeezed flat, the specific pressure is higher in the annular area adjacent to the tube passage, and is maintained at high levels even if there is a certain degree of elasticity decay due to heat and/or aging of the elastic material. A good seal is therefore obtained for a longer time with respect to a conventional gasket.

DESCRIPTION OF OTHER EMBODIMENTS

Figure 3:
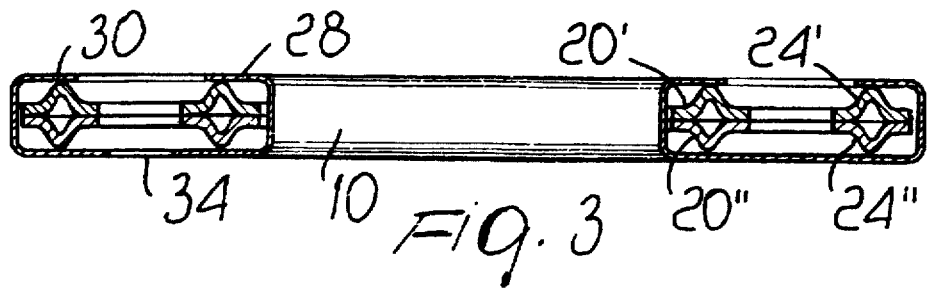
FIG. 3 is a view similar to FIG. 2, and shows a second preferred embodiment of the gasket of the invention.

FIG. 3 shows a second embodiment of the invention, where each of both rings 20, 24 of FIG. 2 is replaced with a pair of identical, rings 20', 20" and 24', 24", placed back-to-back, respectively. The range of elastic deformation is thus doubled, for an adequate seal even where the exhaust tube and its flanges have wide dimensional tolerances.

Figure 4:
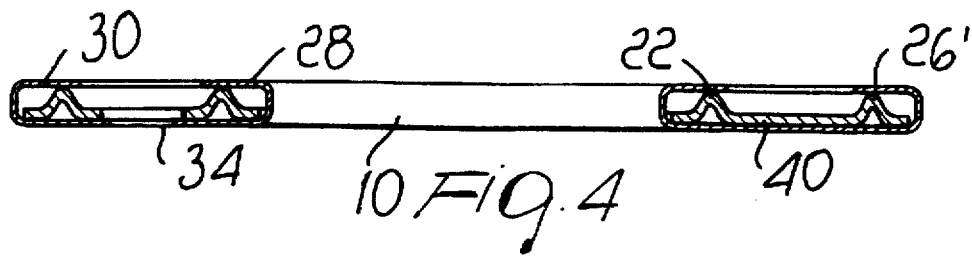
FIG. 4 is a view similar to FIG. 2, and shows a third preferred embodiment of the gasket of the invention.

FIG. 4 shows a third embodiment of the invention, which differs from the embodiment of FIGS. 1 and 2 only in that the two rings 20, 24 of FIGS. 1 and 2 are replaced with a single plate 40, which is cut according to the inside and outside profile of the exhaust tube flange and is provided with ridges 22', 26' corresponding to ridges 22, 26 of FIGS. 1 and 2. Annular gap 32 of FIGS. 1 and 2 is here reduced to the gap between the edges of rims 28, 30, and does not extend downwards to steel sheet 10, but is still sufficient to give rise to the same mode of operation described above. In fact, when the gasket is elastically squeezed so that plate 40 is completely flattened, the central area of the flange is still spaced from the plate of a distance substantially equal to the thickness of rims 28, 30, except for possible slight yielding due to elastic or plastic yieldings.

Figure 5:
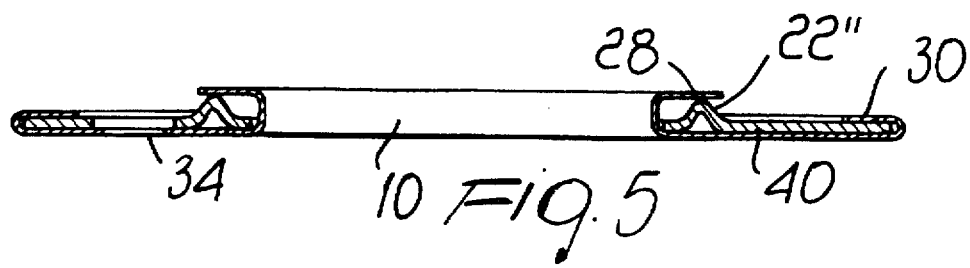
FIG. 5 is a view similar to FIG. 2, and shows a fourth preferred embodiment of the gasket of the invention.

FIG. 5 shows a fourth embodiment of the invention, which is similar to the embodiment of FIGS. 4 in that it comprises a single plate 40 as a source of elastic resistance. However, plate 40 is here provided with a single ridge 22" adjacent to the gas passage in the exhaust tube. Accordingly, this fourth embodiment only lacks the outside ridge, and rim 30 of steel sheet 10 is folded directly onto flat plate 40. When the gasket is placed in operation, ridge 22" is compressed flat and both rims 28 and 30 are brought to complanarity: however, there is no elastic reaction at the outside periphery of the gasket.

Figure 6:
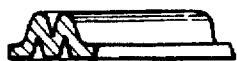
FIG. 6 shows, in radial cross-section, a fragment of another version of elastic ring which can be incorporated in the gaskets shown on FIGS. 1 to 4.
Figure 7:
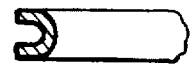
FIG. 7 shows, in radial cross-section, a fragment of still another version of elastic ring which can be incorporated in the gaskets shown on FIGS. 1 to 4.

In all the embodiments described with reference to FIGS. 1 to 5, elastic rings 20, 24 may be replaced with rings having a different structure, e.g. rings having twofold, side-by-side ridges as shown on FIG. 6, or C-shaped rings as shown on FIG. 7. Moreover, in all the embodiments described, the thickness of steel sheet may vary in range of about 0.15 to 0.40 mm, and the thickness of the ring material may vary from about 0.30 to 1.20 mm. Finally, the materials of both rings are not necessarily identical in nature and thickness: for instance, the inside ring might have a different thickness (usually larger) from the outside ring.

Figure 8:
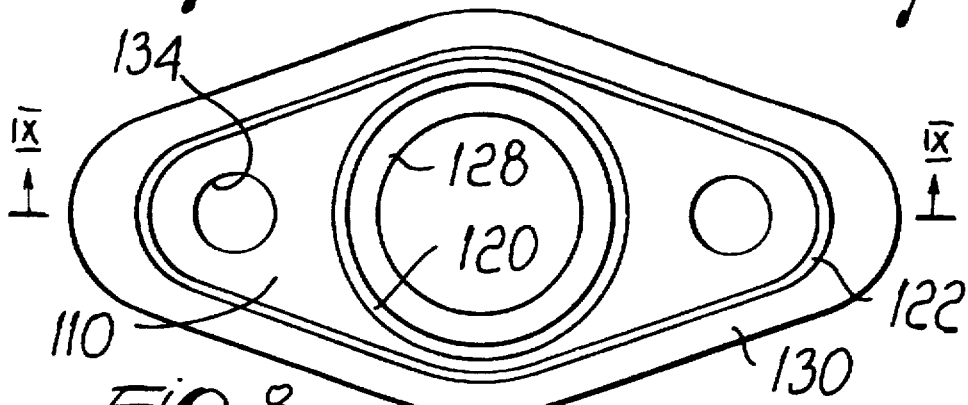
FIG. 8 is a view similar to FIG. 1, and shows a fifth preferred embodiment of the gasket of the invention.
Figure 9:
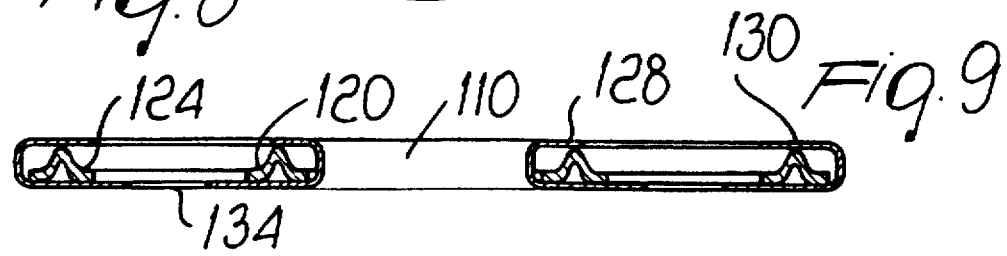
FIG. 9 is a cross-sectional view made along line IX—IX of FIG. 8.

FIGS. 8 and 9 show a gasket for exhaust tubes with diamond-shaped flange. This gasket also comprises a sheet 110 of malleable steel, two elastic rings 120, 124 which are made according to any of the shapes illustrated above, and folded rims 128, 130. Two clamping bores 134 are made in the steel sheet. For this embodiment of the gasket, too, all the versions described above are admissible, i.e. twofold rings, rings merged into a single plate member, etc.

I claim:

1. An exhaust tube gasket for hot combustion gases, comprising:

a ring made of a flat elastic-steel plate of uniform thickness and having an inner edge and an outer edge, the ring being formed with a first V-shaped ridge or bead which extends along the inner edge; and an annular sheet of malleable steel, lying flat against the face of the elastic-steel ring opposite to said ridge, the sheet of malleable steel having an inner rim which is folded over the inner edge of the ring to overhang said first ridge and an outer rim which is folded over the outer edge of the ring.

2. The gasket of claim 1, wherein the ring has a second V-shaped ridge extending along its outer edge, the outer rim of the sheet of malleable steel being folded to overhang said second ridge.

* * * * *